United States Patent Office 3,455,844
Patented July 15, 1969

3,455,844
SULPHURIZED AND PHOSPHORIZED EXTREME PRESSURE AGENTS
Leonard E. Beare, Lansing, Howard J. Matson, Harvey, and John W. Nelson, Lansing, Ill., assignors to Sinclair Research, Inc., a corporation of Delaware
No Drawing. Continuation of application Ser. No. 300,930, Aug. 8, 1963. This application Nov. 16, 1966, Ser. No. 594,946
Int. Cl. C10m *1/48*
U.S. Cl. 252—46.6                20 Claims

ABSTRACT OF THE DISCLOSURE

An oil-soluble lubricating oil additive is prepared which is composed of a sulfurized, phosphorized mixture of a major amount of a defined fat often having a total content of saturated fatty materials of about 45 to 49 weight percent, essentially as triglycerides, a total content of unsaturated fatty materials of about 44 to 59 weight percent, and a minor amount of oleic acid. The additive composition contains about 7 to 11 weight percent combined sulfur and about 0.1 to 2 weight percent combined phosphorous. Extreme pressure properties, for example of mineral oils of lubricating viscosity, are improved by the addition of sufficient amounts of the additive of this invention.

---

This application is a continuation of our application Ser. No. 300,930, filed Aug. 8, 1963.

This invention relates to an improved extreme pressure agent for lubricating oils. More particularly, the invention is directed to a highly stable extreme pressure agent which is an oil-soluble sulfurized, phosphorized mixture of oleic acid and a particular fatty material.

It is well known that the sulfurization and phosphorization of various fatty acids and/or fats provides a product that is effective as an extreme pressure agent for mineral oils. Unfortunately, however, many of these products, especially when fats are utilized, are relatively unstable, that is, when blended with lubricating oils they often form a haze and eventually precipitate from the oil. We have now found that an oil-soluble, sulfurized and phosphorized mixture of oleic acid and a particular fatty material provides not only a very effective extreme pressure agent but one that is surprisingly stable on blending with lubricating oils.

The particular fatty material utilized in the present invention is a fat having the following physical properties:

| | |
|---|---|
| Iodine value F.A.C. | 62–66 |
| Acid number (max.) | 4 |
| Titer, °C. | 37–39 |
| Refractive index at 67° C. | 1.45000–1.45050 |
| Hydroxyl value (max.) | 3 |
| Percent moisture and volatiles AOCS[1] Ca–2C–25 (max.) | 1.2 |
| Percent insolubles AOCS Ca 3–46 (max.) | 0.3 |
| Percent unsaponifiables (max.) | 0.5 |
| Cloud point, °F. | 75–85 |
| Pour point, °F. | 65–75 |
| Free fatty acid, percent (max.) | 2 |
| Butyro value, °C. | 34–36 |

[1] American Oil Chemist Society.

Fat or fatty materials that meet these physical properties are suitable components for the preparation of the extreme pressure agent of this invention, although the preferred fat is a straight run (not blended), choice, white, all hog grease that has the aforementioned properties. Generally, the total content of saturated fatty materials in this hog grease is about 45 to 49%, of which about 16 to 18% is stearic acid and about 26 to 28% is palmitic acid, essentially as the triglycerides. The total content of mono-unsaturates in the fat is usually about 44 to 49% of which about 42 to 45% are $C_{18}$ mono-unsaturates (oleates) and the total content of polyunsaturates is a maximum of about 10%. These percents are by weight. It is emphasized that to be a suitable component the fat must have properties within the above listed ranges. Fatty materials, even other grades of hog fat, which do not meet these specifications do not provide the advantageous extreme pressure agent of the invention.

By way of further identification the following gas chromatographic analyses of a typically suitable white fat is included. The analyses were obtained on the methyl esters of the fatty acids constituting the fat. The superscript numbers indicate the number of double bonds:

| | Percent |
|---|---|
| $C_{14}^{\;0}$ | 2.3 |
| $C_{14}^{\;1}$ | 0.4 |
| $C_{15}^{\;0}$ | 0.3 |
| $C_{15}^{\;1}$ | ----- |
| $C_{16}^{\;0}$ | 27.0 |
| $C_{16}^{\;1}$ | 2.7 |
| $C_{16}^{\;2}$ | ----- |
| $C_{17}^{\;0}$ | 0.7 |
| $C_{17}^{\;1}$ | 0.5 |
| $C_{18}^{\;0}$ | 17.4 |
| $C_{18}^{\;1}$ | 43.6 |
| $C_{18}^{\;2}$ | 5.1 |
| $C_{18}^{\;3}$ | Trace |
| $C_{20}$ | Trace |
| Total saturates | 47.7 |
| Total monounsaturates | 47.2 |
| Total polyunsaturates | 5.1 |

The oleic acid component of the mixture which is sulfurized and phosphorized to produce the additive of the present invention can be selected from the various grades of oleic acids commercially available. A particularly preferred oleic acid is undecolorized technical grade oleic acid having the following specifications:

| | |
|---|---|
| Titer, °C. (max.) | 5 |
| Iodine value | 88–95 |
| Free fatty acid (percent as oleic) | 97–101 |
| Acid value | 193–201 |
| Saponification value | 194–203 |
| Unsaponifiables, percent (max.) | 3 |

The ratio of the fat of the invention to the oleic acid component can vary from about 2:1 to 20:1 and is preferably about 2.5:1 to 4.5:1.

The sulfurization and phosphorization of the oleic acid-fat mixture of the invention can be accomplished by any of the various methods employed in the art but in each case should be conducted in a manner that provides the mixtures with about 7 to 11% by weight of combined sulfur, preferably about 8 to 10%, and about 0.1 to 2%, preferably about 0.2 to 1.0%, by weight of combined phosphorus. A particularly preferred method of conducting the sulfurization-phosphorization comprises heating a fluid mixture of the components and first sulfurizing the resulting mixture with a sulfurizing agent such as sulfur flour or lump sulfur at a temperature of about 300 to 400° F. preferably about 315 to 400° F. for a time sufficient to provide the mixture with the aforementioned approximately 7 to 11% of sulfur, preferably about 8 to 10% by weight. When sulfur flour is employed as the sulfurizing agent, it is preferred to actually add this amount of sulfur flour to the mixture and conduct the sulfurizing reaction so as to react substantially all of the sulfur with the mixture. The time required for complete reaction of the sulfur will vary depending upon the reaction temperature selected but usually falls in the range of about 0.25 to 18 hours. For example, it has been found that a reaction time of from 15 to 30 minutes is adequate for sulfurization at 400° F. Sulfurization times of one hour at 300° F. followed by two hours at 375° F. or times of half an hour at 320° F. followed by three hours at 375° F. are also adequate.

After sulfurization of the fat and oleic acid, the sulfurized product is then phosphorized employing a suitable phosphorizing agent to introduce about 0.1 to 2%, preferably 0.2 to 1% phosphorus in combined form into the fat-oleic acid mixture. The preferred phosphorizing agents, are the phosphorus sulfides such as $P_2S_5$, $P_4S_3$ phosphorus $P_4S_7$ with sesquisulfide ($P_4S_3$) being particularly preferred. The phosphorization or more accurately phosphosulfurization is conveniently conducted by adding about 0.1 to 1.2%, preferably about 0.8%, by weight of the phosphorus sesquisulfide to the sulfurized fat-oleic acid mixture and heating the resulting mixture at a temperature of about 220 to 260° F., preferably 230 to 250° F. for a time sufficient to provide the aforementioned amounts of phosphorus. Again the reaction time will vary with the reaction temperature selected but will usually fall in the range of about 2.5 to 10 hours. Since when employing the phosphorus sulfides, the treatment is a phosphosulfurization, it acts to provide the fat-oleic acid mixture with an additional amount of sulfur, usually in the range of about 0.2 to 0.4% by weight.

In another embodiment of the present invention, it has been found advantageous to provide during the phosphorus sulfide treating step described above a small amount of a cyclomonoalkene of 5 to 20 carbon atoms. Preferred cyclomonoalkenes are the terpenes, particularly alpha-pinene. Introduction of the cyclo-olefin can be before the phosphorus sulfide treatment but is preferably added after the treatment has started and when a white cloud has begun to form from the reaction. The role of the cyclo-olefin is not entirely understood but it is believed to react with incompletely reacted phosphorus sulfides or intermediates and thereby eliminate the white fumes or cloud that forms during the reaction. One theory advanced is that at the reaction temperature employed the phosphorus sulfide or other forms of phosphorus present react with atmospheric oxygen and traces of moisture to form phosphorus acids that appear as a white cloud above the reaction mixture when air is admitted to check the completion of the reaction. The cycloalkene is thought to react with these phosphorus compounds to prevent their volatilization to form the white cloud since upon addition of the cycloalkene only a few minutes elapse before no white fumes are visible. In addition, introduction of the cycloalkene has been found to improve the response of lubricating oils to rust inhibitors and also to decrease the obnoxious odors believed to result from small amounts of protein material in the base fats and hydrogen sulfide from the phosphorus sulfide reaction. The cycloalkene is added in an amount sufficient to stabilize the phosphorus compounds, i.e. eliminate the white fumes but not so much that it reduces the flash point of the lubricating oil beyond acceptable limits. Usually about 1 to 4%, preferably about 2 to 3%, by weight of the cycloalkene based on the reaction product, is satisfactory.

If desired the phosphosulfurized reaction mixture can be treated with formaldehyde polymers, preferably as a final step in their manufacture in order to reduce the offensive odor of the phosphosulfurized product. Suitable formaldehyde polymers include, both the linear and cyclic formaldehyde polymers containing say about 3 to 100 or more aldehyde units. The preferred formaldehyde polymers are paraformaldehyde and trioxane. Examples of other suitable polymers are the mixed polyoxymethylene glycols having the formula $HO(CH_2O)_nH$ where $n$ equals 6 to 100; gamma- and deltapolyoxymethylene $$CH_3O(CH_2O)_nCH_3$$

and  where $n$ is greater than 100; the cyclic polymers, trioxane and tetraoxymethylene.

In carrying out the formaldehyde polymer treatment, a minor amount of the formaldehyde polymer sufficient to provide a substantial deodorizing effect, preferably about 0.05 to 0.3% by weight based on the total phosphosulfurized reaction, is mixed with the reaction mixture and heated at a temperature of about 220 to 260° F., preferably about 230 to 250° F. Since these temperatures are those employed in the phosphorus sulfide treatment, the formaldehyde polymer treatment is most conveniently conducted near the end of the phosphosulfurizing step before the reaction mixture has a chance to cool below about 220° F. The reaction mixture containing the formaldehyde polymer is usually treated for at least about 0.25 hour up to about 3 hours, preferably about 0.5 to 1 hour and then cooled.

The mineral oil base stock to which the oil-soluble additive of the present invention can be added is of lubricating viscosity and can be, for instance, an acid-treated, solvent-extracted or solvent-refined oil obtained in accordance with conventional methods of refining lubricating oils. Generally, lubricating oils have viscosities from about 20 to 250 SUS at 210° F. The base oil may be derived from paraffinic asphaltic, naphthenic or mixed-base crudes and, if desired, blends of various oils can be employed as, for instance, a blend of solvent-treated, Mid-Continent neutrals and Mid-Continent bright stocks. A particularly suitable base oil is a solvent treated Mid-Continent bright stock having a viscosity index of about 85 or higher.

The amount of the sulfurized-phosphorized additive incorporated into the base oil will vary depending on the particular characteristics of the lubricating oil utilized but will be sufficient to improve the extreme pressure properties of the oil. In general, the additive is present in amounts of about 1 to 10%, preferably about 5 to 7% by weight.

The composition of the invention can also contain other additives commonly added to lubricating oils in small amounts to improve other properties of the oil as, for example, antioxidants, rust inhibitors, defoaming agents, pour depressors, deodorants, other extreme pressure agents, etc.

The following exampes are included to further illustrate the present invention.

Example I

To a stirred 200 gal. Pfaudler kettle were charged 1100 pounds (74 wt. percent) of a choice white hog grease at 125° F., 253 pounds (17 wt. percent) of undecolorized technical grade oleic acid at 78° F. and 134 pounds (9 wt. percent) of sulfur flour. The choice white hog grease employed had the following physical properties.

| | |
|---|---|
| Iodine value F.A.C. | 64.8 |
| Acid number | 1.12 |
| Titer, ° C. | 37–38 |
| Refractive index at 67° C. | 1.45030 |
| Hydroxyl value | 2.16 |
| Percent moisture and volatiles AOCS Ca–2C–25 | 0.360 |
| Percent insolubles AOCS Ca 3–46 | 0.172 |
| Percent unsaponifiables | 0.27 |
| Cloud point, ° F. | 78 |
| Pour point, ° F. | 70 |
| Free fatty acid percent | 0.56 |
| Butyro value, ° C. | 34–36 |

The mixture was then heated to 315° F. and maintained at that temperature for 18 hours. It was then cooled to 220° F. and 11.9 pounds (+0.8 wt. percent) of phosphorus sesquisulfide was added slowly. This temperature was maintained for 3 hours. The kettle contents were then raised to a temperature of 250° F. and held there for four hours. Then 29.7 pounds (+2.0 wt. percent) of alpha-pinene were added and the kettle contents were held at 250° F. for 1.5 hours before cooling to 180° F. Six hundred seventy five grams (+0.1 wt. percent) of trioxymethylene were then added and the mixture was cooled to 150° F. over one hour. Then 338 grams (+0.05 wt. percent) of trioxane were added and agitation continued for one-half hour before pumping to storage. This material had the following analysis:

| | |
|---|---|
| Viscosity SUS at 210° F. | 412.9 |
| Viscosity kinematic at 210° F. cs. | 88.47 |
| Sulfur percent | 9.26 |
| Phosphorus percent | 0.444 |
| Acid number | 36 |
| Saponification number | 222 |

The short reaction time process for preparing the additive of the present invention is shown in the following example.

Example II

Standard laboratory equipment was used in this run, consisting of a 5 liter-5 necked round bottom flask equipped with a bimetallic controlled heating mantle, motor driven glass paddle stirrer and thermometer. To the flask were charged 2141 g. (66 wt. percent) of the hog grease of Example I at about 125° F., 811 g. (25 wt. percent) undecolorized oleic acid and 292 g. (9.0 wt. percent) of sulfur flour. Agitation was started and the flask heated to 320° F. and maintained at that temperature for four hours. The flask was then allowed to cool to 160° F. before turning off the stirrer for the night. The next morning agitation was started, the flask heated to 250° F. and 26 g. (+0.8 wt. percent) $P_4S_3$ was added. After 2.5 hours at 250° F., 98 grams (+3.0 wt. percent) of alpha-pinene was added and the reaction continued for one hour. Then 5 g. (+0.15 wt. percent) of paraformaldehyde was added and the flask cooled over 1.25 hours to 160° F. and emptied. The additive had the following analysis:

| | |
|---|---|
| Viscosity SUS at 210° F. | 200.9 |
| Viscosity kinematic at 210° F. cs. | 42.93 |
| Sulfur percent | 9.34 |
| Phosphorus percent | 0.437 |
| Acid number | 49 |
| Saponification number | 24 |

The additives prepared as shown in Examples I and II were blended into SAE 90 grade gear oils identified in Table I below and each of the oil samples was subjected to the tests also shown in Table I below.

TABLE I.—SAE 90 GRADE GEAR OILS

| Sample No. 820 | 5258 | 5284 | 6216 |
|---|---|---|---|
| Naphthenic neutral oil having a vis. of approx. 34 SUS at 210° F., wt. percent | 22.5 | | 20.4 |
| Naphthenic neutral oil having a vis. of approx. 38 SUS at 210° F., wt. percent | | 29 | |
| Mid-Continent bright stock having a vis. of approx. 150 SUS at 210° F., wt. percent | 70.4 | 64 | 74.3 |
| Additive, Example | I | I | II |
| weight percent | 7 | 7 | 5 |
| Oil blend:[2] | (³) | | (⁴) |
| Vis. at 100° F. SUS | 1,002 | 1,032 | 1,017 |
| Vis. at 210° F. SUS | 88.86 | 88.57 | 87.88 |
| Vis. Index | 96 | 93 | 93 |
| Brookfield vis., 0° F., cps | 54,600 | 69,000 | 78,900 |
| Flash, ° F. | 375 | | ¹400 |
| Fire, ° F. | 420 | | ¹435 |
| Pour Point, ° F. | −20 | −15 | −15 |
| Channel, −30° F. | Pass | Pass | Pass |
| Copper strip, 3 hr., 250° F. | 3b | 3b | 3b |
| Timken 0–65, rust 24 hrs. | OK | OK | Spots |
| Haze (after 24 hrs.) | None | None | None |
| G.M. oxidation: | | | |
| Sludge | ¹Med. | Med. | Heavy |
| Vis. rise, percent | ¹6.8 | 10 | 4.4 |
| Evaporation, percent | ¹4.0 | 5.5 | 2.0 |
| Sludge accumulation:[5] | | | |
| Sludge and varnish, percent | 0.236 | 0.188 | 0.26 |
| Varnish, percent | 0.012 | 0.005 | 0.02 |
| Copper loss, mg | 2.4 | +0.4 | +2.0 |
| Timken breakdown, lbs. pass | 60 | ¹60 | <50 |
| Timken L–37, 200 r.p.m., lbs. pass [6] | 300 | 250 | 300 |
| Loss, mg | 9.0 | 10.0 | 13.5 |
| Timken L–37, 400 r.p.m., lbs. pass [6] | 150 | 175 | 200 |
| Loss, mg | 4.5 | 5.0 | 7.4 |
| G.M. Cold Test | Pass | Pass | Pass |

[1] Typical tests.
[2] All blends contained 0.1 wt. percent Acryloid 150 and 0.005 wt. percent of a defoaming agent. Acryloid 150 is a polymethacrylate pour depressor having a flash point of 400° F., a viscosity SUS at 100° F. of 23,000 and a viscosity SUS at 210° F. of 3,200.
[3] Contained 0.003% Maskodor (a deodorant).
[4] Contained 0.05% tetrapropenyl succinic anhydride as a corrosion inhibitor.
[5] See footnote 2, Table III.
[6] See footnote 3, Table III.

The data of Table I demonstrate the advantageous extreme pressure properties provided the lubricants by the additive of the present invention.

Example III

This example is included to demonstrate the importance of the particular fat employed in the preparation of the additive of the invention. Additives were prepared by repeating Example I but utilizing in place of the hog fat employed therein other industrial hog fats having the physical properties shown in Table II below. Seven percent by weight of each of the additives prepared was compounded with two different base lubricating oils identified in Table II and the resulting composition inspected for haze after 24 hours. For comparison, seven percent of the additive of Example I was added to the base oil and the resulting composition also inspected for haze. The results of the inspections and the physical properties of the fats and additives prepared are shown in Table II.

TABLE II.—COMPARISON OF UNSUITABLE FATS

| Industrial Fat. No. | 1 | 4 | 5 | Brown Grease | Additive of Ex. I |
|---|---|---|---|---|---|
| Sample No. 803 | 2261 | 2275 | 6058 | 2261 | |
| Iodine Value | 68.4 | 73.8 | 51.5 | 61.6 | |
| Acid No. | 2.3 | 3.17 | 3.96 | 15.6 | |
| Saponification No | 192 | 192 | 192 | 192 | |
| Hydroxyl No. | 3.5 | 4.7 | 0.16 | | |
| Titer, ° C | 34.4 | 33.2 | | 38.9 | |
| Unsaponifiables, Percent | 0.47 | 0.58 | 0.19 | 0.76 | |
| Additive Prep.: | | | | | |
| Sample No. 820 | 6035 | 6082 | 6066 | | |
| Sulfur, Percent | 9.83 | 9.20 | 9.24 | | 9.26 |
| Phosphorus, Percent | 0.494 | 0.453 | 0.451 | | 0.444 |
| Acid No. | 47.8 | 39.1 | 36.6 | | 36 |
| Saponification No | 212.2 | 217.6 | 221.4 | | 222 |
| Kinematic vis. 210° F., cs | 113 | 144.6 | 79.7 | | 88.47 |
| Oil blend (+7% additive)¹ 150 SUS at 210° F. Mid-Continent bright stock. | Very hazy | Hazy | Sl. hazy | | Clear |
| Blend of 211 SUS at 210° F. deasphalted and dewaxed Mid-Continent cylinder stock and 100 SUS at 100° F. Mid-Continent Neutral oil. | | | | Solid | Clear |

[1] After 24 hours.

Example IV

Additives were prepared utilizing 9% sulfur, 0.8% phosphorus sesquisulfide, 3% alpha-pinene and 0.15% paraformaldehyde by the procedure described in Example II above except that the amount of oleic acid was varied. 7% by weight of the resulting additives were incorporated into 90 SAE lubricating oil and the compositions were subjected to the tests shown in Table III below. The results of the tests are also shown in Table III.

TABLE III.—EFFECT OF CONCENTRATION OF OLEIC ACID

| Sample No. 820 | 6184 | 6179 | 6141 | 6200 |
| --- | --- | --- | --- | --- |
| Additive: | | | | |
| % oleic acid | 5 | 10 | 17 | 25 |
| Kin. vis. 210° F., cs | 60.3 | 56.34 | 47 | 42.9 |
| Oil blend SAE 90: | | | | |
| G.M. cold test, seconds | 5 | 4 | | 3 |
| Brookfield vis., 0° F., cps | 94,000 | 75,100 | 73,500 | 56,900 |
| Pour Point, ° F | −5 | −10 | −15 | −10 |
| Channel, −30° F | Pass | Pass | Pass | Pass |
| Copper strip, 3 hrs. 250° F | 4a | 3b | 3b | 3b |
| G.M. oxidation: | | | | |
| Sludge | Heavy | Med. | Med. | Med. heavy |
| Evaporation loss, percent | 1.5 | 1.0 | 2.0 | 3.0 |
| Viscosity rise, percent | 3.7 | 3.5 | 4.5 | 3.2 |
| Sludge accumulation:[2] | | | | |
| Sludge and varnish, percent | 0.110 | 0.141 | 0.176 | 0.355 |
| Varnish, percent | 0.003 | 0.007 | 0.003 | 0.034 |
| Copper loss, mg | 2.5 | 2.1 | 2.6 | 5.3 |
| Timken, safe load lbs | 50 | 70 | 70 | 80+ |
| Timken L–37, 200 r.p.m., safe load lbs[3] | [1]300 | 300 | 300 | 300 |
| Cup and block, mg. loss | 9.4 | 9.0 | 11.9 | 6.1 |
| Timken L–37, 400 r.p.m. safe load lbs[3] | [1]175 | [1]175 | 175 | [1]200 |
| Cup and block, mg. loss | 9.8 | | 4.8 | 4.2 |

[1] Borderline pass.
[2] The sludge accumulation test is a modified ASTM procedure. In brief, 25 ml. of the oil is treated with 0.5 liter of air per hour for 120 hours at 120° C. in the presence of a tared 18 gauge copper wire 6 inches long. ASTM naphtha is used to separate the sludge from the varnish.
[3] The Timken L–37 is a modified Timken test where a fixed load is applied for a specified time after a 50 lb. one-half hour breaking period. The oil temperature is maintained at 275° F. Ridging of the cup and block indicates a fail load. The 200 r.p.m. test runs for 16 hours and the 400 r.p.m. test for 1.5 hours. The cup and block are weighed before and after the test to determine the weight loss. The test block reciprocates a distance of 0.13 inch two times a minute in the direction of the load lever. This arrangement produces an extremely high unit pressure at essentially line contact conditions.

TABLE IV

| Sample No. 820 | 6253 | 6218 | 6245 | 6225 |
| --- | --- | --- | --- | --- |
| Additive: | | | | |
| Sulfur, percent | 7.0 | 9.3 | 10.0 | 10.9 |
| Kin. vis. 100° F., cs | 303.0 | | 696.0 | 963.6 |
| Kin. vis. 210° F., cs | 27.04 | 42.9 | 51.32 | 63.40 |
| Viscosity Index | 116 | | 117 | 116 |
| Oil blend: | | | | |
| Kin. vis. 100° F., cs | 221.7 | 220.1 | 230.5 | 223.8 |
| Kin. vis. 210° F., cs | 17.52 | 17.53 | 17.98 | 17.61 |
| Viscosity Index | 92 | 93 | 93 | 93 |
| Brookfield vis. 0° F., cps[2] | 84,200 | 71,800 | 62,000 | 74,900 |
| Channel, −30° F | Pass | Pass | Pass | Pass |
| Pour Point, ° F | −10 | −15 | −20 | −15 |
| G.M. oxidation: | | | | |
| Sludge | Med. Heavy | Heavy | Heavy | Med. Heavy |
| Vis. rise, percent | 7.7 | 3.0 | 4.0 | 6.0 |
| Evaporation loss, percent | 3.0 | 1.5 | 1.0 | 2.5 |
| Sludge accumulation:[3] | | | | |
| Sludge and varnish, percent | 0.088 | 0.25 | 0.26 | 0.25 |
| Varnish, percent | 0.020 | 0.03 | 0.05 | 0.03 |
| Copper loss, mg | 3.1 | 1.7 | 2.9 | +13.4 |
| Copper strip, 3 hr. 250° F | 3b | 2c | 3b | 3b |
| G.M. Cold Test, secs | 3 | 3 | 3 | 3 |
| Timken breakdown, lbs | 70 | 170 | 40 | 50 |
| Timken L–37 200 r.p.m., lbs[4] | 200 | 300 | 250 | 300 |
| Cup and block, mg. loss | 3.8 | 16.4 | 11.1 | 14.1 |
| Timken L–37 400 r.p.m., lbs[4] | <150 | 200 | <150 | <200 |
| Cup and block, mg. loss | | 6.4 | 23.4 | 30.6 |

[1] Borderline pass.
[2] Brookfield viscosity at 0° F. may vary ±0.5° F.
[3] See footnote 2, Table III.
[4] See footnote 3, Table III.

The data of Table IV illustrate that the addition of from 7 to 11% sulfur effects the production of an additive when incorporated in a base oil provides the base oil with excellent extreme pressure properties. The data also show that the preferred amount of added sulfur is about 9%, 7% not giving the desirable maximum extreme pressure properties while over 10% added sulfur has a tendency to increase the wear of copper-containing bearings.

Examples of gear oil formulations containing the novel additive of the present invention are illustrated in Table V below.

TABLE V.—GEAR OIL FORMULATIONS

| Sample No. 820 | 5018 | 5019 | 5020 | 5021 | 6204 | 6405 | 6218 |
| --- | --- | --- | --- | --- | --- | --- | --- |
| SAE Grade | 75 | 80 | 90 | 140 | 80 | 90 | 90 |
| 34 SUS at 210° F. naphthenic neutral oil, wt. percent | | | 27 | | 35.8 | | 20.4 |
| 38 SUS at 210° F. naphthenic neutral oil, wt. percent | 93 | 53 | | | | | |
| 200 SUS at 100° F. Mid-Continent neutral oil, wt percent | | | | | | 29.2 | |
| 150 SUS at 210° F. Mid-Continent bright stock, wt. percent | | 40 | 66 | 93 | 57.2 | 63.8 | 74.3 |
| Additive | 7 | 7 | 7 | 7 | 7 | 7 | 5 |
| Acryloid 150, wt. percent | 0.1 | 0.1 | 0.1 | 0.1 | 0.1 | 0.1 | 0.1 |
| Tetrapropenyl succinic anhydride (as a corrosion inhibitor) | 0.05 | 0.05 | 0.05 | 0.05 | 0.05 | 0.05 | 0.05 |
| Defoaming agent | 0.005 | 0.005 | 0.005 | 0.005 | 0.005 | 0.005 | 0.005 |
| Maskodor (deodorant) | 0.003 | 0.003 | 0.003 | 0.003 | | | |
| Viscosity at 100° F. SUS | 141.2 | 470.4 | 1111 | 2874 | 514.0 | 1155 | 1020 |
| Viscosity at 210° F. SUS | 41.9 | 61.31 | 92.1 | 162.5 | 64.4 | 94.7 | 88.1 |
| Brookfield vis., 0° F., cps | 2,610 | 15,680 | 94,900 | | | 314,000 | 71,800 |
| Viscosity Index | 79 | 94 | 93 | 95 | 98 | 94 | 93 |
| Gravity, °API | 23.2 | 23.7 | 24.1 | 24.3 | | | |
| Flash, ° F | 345 | 360 | 395 | 515 | | | |
| Fire, ° F | 370 | 390 | 445 | 595 | | | |
| Pour, ° F | −45 | −30 | −15 | 0 | −25 | 0 | −15 |

The data of Table III demonstrate that increasing the proportion of oleic acid in the fat-oleic acid mixture of the invention results in final additives that provide better low temperature viscosity properties as well as greater extreme pressure properties.

Example V

Employing the procedure of Example II above, several additives were prepared containing various amounts of sulfur. Each of the additives in a concentration of 5% by weight was blended in mineral based gear oil. The additive-containing compositions were then tested as in Example IV. The results are shown in Table IV.

We claim:

1. An oil-soluble lubricating oil additive consisting essentially of a sulfurized, phosphorized mixture of oleic acid and a fat in a weight ratio of fat to said oleic acid of about 2:1 to 20:1, said fat being characterized by the following physical properties:

Iodine value F.A.C. _____ 62–66
Acid number (max.) _____ 4
Titer ° C. _____ 37–39
Refractive index at 67° C. _____ 1.45000–1.45050
Hydroxyl value (max.) _____ 3

| | |
|---|---|
| Percent moisture and volatiles AOCS Ca-2C-25 (max.) | 1.2 |
| Percent insolubles AOCS Ca 3-46 (max.) | 0.3 |
| Percent unsaponifiables (max.) | 0.5 |
| Cloud point, °F. | 75-85 |
| Pour point, °F. | 65-75 |
| Free fatty acid percent (max.) | 2 |
| Butyro value, °C. | 34-36 | said additive containing about 7 to 11% by weight of combined sulfur and 0.1 to 2% by weight combined phosphorus.

2. The additive of claim 1 wherein the weight ratio of the fat to oleic acid is about 2.5:1 to 4.5:1.

3. The additive of claim 2 wherein the additive contains about 8 to 10% by weight of combined sulfur and about 0.2 to 1% by weight of combined phosphorus.

4. The additive of claim 3 wherein the mixture of oleic acid and fat is provided with about 1 to 4% by weight cyclomonoalkene of 5 to 20 carbon atoms, during the phosphorizing.

5. The additive of claim 4 wherein the cyclomonoalkene is alpha-pinene.

6. A composition consisting essentially of a base mineral oil of lubricating viscosity and a small amount of the additive of claim 1, said amount being sufficient to improve the extreme pressure properties of the oil.

7. The composition of claim 6 wherein the amount of the additive is about 1 to 10% by weight.

8. The composition of claim 7 wherein the additive contains about 8 to 10% by weight of combined sulfur and about 0.2 to 1% by weight of combined phosphorus and the weight ratio of the fat to oleic acid is about 2.5:1 to 4.5:1.

9. The composition of claim 8 wherein the mixture of oleic acid and fat is provided with about 1 to 4% by weight cyclomonoalkene of 5 to 20 carbon atoms, during the phosphorizing.

10. The additive of claim 9 wherein the cyclomonoalkene is alpha-pinene.

11. An oil-soluble lubricating oil additive consisting essentially of a sulfurized, phosphorized mixture of oleic acid and a fat in a weight ratio of fat to said oleic acid of about 2:1 to 20:1, said fat being characterized by the following physical properties:

| | |
|---|---|
| Iodine value F.A.C. | 62-66 |
| Acid number (max.) | 4 |
| Titer, °C. | 37-39 |
| Refractive index at 67° C. | 1.45000-1.45050 |
| Hydroxyl value (max.) | 3 |
| Percent moisture and volatiles AOCS Ca-2C-25 (max.) | 1.2 |
| Percent insolubles AOCS Ca 3-46 (max.) | 0.3 |
| Percent unsaponifiables (max.) | 0.5 |
| Cloud point, °F. | 75-85 |
| Pour point, °F. | 65-75 |
| Free fatty acid percent (max.) | 2 |
| Butyro value, °C. | 34-36 | and said fat comprising about 45 to 49 weight percent saturated fatty materials of which about 16 to 18 weight percent is stearic acid and about 26 to 28 weight percent is palmitic acid, essentially as triglycerides, about 44 to 49 weight percent mono-unsaturated fatty materials of which about 42 to 45 weight percent are oleates, and up to about 10 weight percent polyunsaturates, said additive containing about 7 to 11 weight percent of combined sulfur and about 0.1 to 2 weight percent combined phosphorus.

12. The additive of claim 11 wherein the weight ratio of the fat to oleic acid is about 2.5:1 to 4.5:1.

13. The additive of claim 12 wherein the additive contains about 8 to 10% by weight of combined sulfur and about 0.2 to 1% by weight of combined phosphorus.

14. The additive of claim 13 wherein the mixture of oleic acid and fat is provided with about 1 to 4% by weight cyclomonoalkene of 5 to 20 carbon atoms, during the phosphorizing.

15. The additive of claim 14 wherein the cyclomonoalkene is alpha-pinene.

16. A composition consisting essentially of a base mineral oil of lubricating viscosity and a small amount of the additive of claim 11, said amount being sufficient to improve the extreme pressure properties of the oil.

17. The composition of claim 16 wherein the amount of the additive is about 1 to 10% by weight.

18. The composition of claim 17 wherein the additive contains about 8 to 10% by weight of combined sulfur and about 0.2 to 1% by weight of combined phosphorus and the weight ratio of the fat to oleic acid is about 2.5:1 to 4.5:1.

19. The composition of claim 18 wherein the mixture of oleic acid and fat is provided with about 1 to 4% by weight cyclomonoalkene of 5 to 20 carbon atoms, during the phosphorizing.

20. The additive of claim 19 wherein the cyclomonoalkene is alpha-pinene.

References Cited

UNITED STATES PATENTS

| | | | |
|---|---|---|---|
| 2,308,427 | 1/1943 | Roehner et al. | 252—46.6 |
| 2,498,628 | 2/1950 | Cyphers et al. | 252—46.6 |
| 2,587,642 | 3/1952 | Musselman et al. | 252—46.6 |
| 2,804,431 | 8/1957 | Wythe | 252—46.6 |
| 2,885,363 | 5/1959 | Wolfram et al. | 252—46.6 |
| 2,211,231 | 8/1940 | Henderson | 252—46.6 |
| 2,379,453 | 7/1945 | Noland | 252—46.6 XR |
| 2,483,600 | 10/1949 | Stucker et al. | 252—46.6 |
| 2,654,711 | 10/1953 | Kirshenbaum et al. | 252—46.6 |
| 2,804,431 | 8/1957 | Wythe | 252—46.6 |
| 2,968,619 | 1/1961 | Manteufel et al. | 252—46.6 XR |

FOREIGN PATENTS

| | | |
|---|---|---|
| 530,902 | 9/1956 | Canada. |

OTHER REFERENCES

Manufacture and Application of Lubricating Greases, C. J. Boner, Reinhold Publishing Corp., 1954, pp. 127, 128.

Kirk-Othmer: "Encyclopedia of Chemical Technology," vol. 6 (1951) p. 143, Interscience Publishers Inc.

DANIEL E. WYMAN, Primary Examiner

W. CANNON, Assistant Examiner